United States Patent Office 3,379,712
Patented Apr. 23, 1968

3,379,712
DISAZO DYES FOR HYDROPHOBIC FIBERS
Max A. Weaver and David J. Wallace, Kingsport, Tenn., assignors to Eastman Kodak Company, Rochester, N.Y., a corporation of New Jersey
No Drawing. Filed Oct. 14, 1965, Ser. No. 496,131
8 Claims. (Cl. 260—157)

ABSTRACT OF THE DISCLOSURE

Water-insoluble disazo compounds containing the group

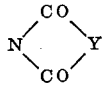

wherein Y represents a chain of carbon atoms and at least one oxygen, sulfur or nitrogen atom which are useful as dyes for textile fibers with fast shades with good fastness properties especially to light, washing, atmosphere fumes and sublimation.

---

This invention relates to disazo compounds particularly useful as dyes for textile fibers, yarns and fabrics. More particularly, this invention relates to disazo compounds of the general formula

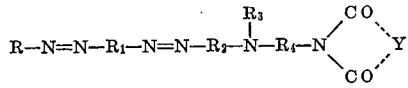

wherein:

R represents a monocyclic carbocyclic aromatic radical of the benzene series including unsubstituted and substituted phenyl such as lower alkylphenyl, e.g., o,m,p-tolyl; lower alkoxyphenyl, e.g., o,m,p-methoxyphenyl; halophenyl, e.g., o,m,p-chlorophenyl; nitrophenyl, e.g., o,m,p-nitrophenyl; lower alkylsulfonylphenyl, e.g., o,m,p-methylsulfonylphenyl; lower alkylsulfonamidophenyl, e.g., o,m,p-methylsulfonamidophenyl; lower di(alkylsulfonyl)phenyl, e.g., 2,5-di(methylsulfonyl)phenyl; dicarboxylicacidimidophenyl, e.g., o,m-succinimidophenyl; fluoroalkylphenyl, e.g., trifluoromethylphenyl; lower alkanoylamidophenyl, o,m,p-acetamidophenyl; cyanophenyl, e.g., o,m,p-cyanophenyl; carboxamidophenyl, e.g., o,m,p-carboxamidophenyl; benzamidophenyl; thiocyanophenyl, e.g., o,m,p-thiocyanophenyl; lower alkylthiophenyl, e.g., o,m,p-methylthiophenyl; benzoxyphenyl, e.g., o,m,p-benzoxyphenyl; benzylaminophenyl, e.g., o,m,p-benzylaminophenyl; N-alkylbenzaminophenyl, e.g., N-phenylmethylaminophenyl; formylphenyl, e.g., o,m,p-formylphenyl; lower carbalkoxyphenyl, e.g., o,m,p-carbethoxyphenyl; benzoylphenyl, e.g., o,m,p-benzoylphenyl; etc.

$R_1$ and $R_2$ represent monocyclic carbocyclic aromatic radicals of the benzene series including unsubstituted p-phenylene and p-phenylene substituted with lower alkyl, e.g. o,m-methyl-p-phenylene; lower alkoxy, e.g., o,m-methoxy-p-phenylene; halogen, e.g. o,m-chloro-p-phenylene, lower alkylsulfonamido, e.g. o,m-methylsulfonaamido-p-phenylene; lower alkanoylamido, e.g. o,m-acetamido-p-phenylene, lower alkylthio, e.g. o,m-methylthio-p-phenylene, etc.

$R_3$ represents hydrogen or an alkyl radical preferably lower alkyl, i.e., from 1 to 4 carbon atoms, being unsubstituted or substituted such as hydroxyalkyl, e.g., hydroxyethyl; polyhydroxyalkyl, e.g., 2,3-dihydroxypropyl; lower alkoxyalkyl, e.g., methoxyethyl; cyanoalkyl, e.g., cyanoethyl; lower cyanoalkoxyalkyl, e.g., β-cyanoethoxyethyl; lower alkanoyloxyalkyl, e.g., acetoxyethyl; lower carboalkoxyalkyl, e.g., carbethoxyethyl; halogenoalkyl, e.g., chloroethyl; hydroxyhalogenoalkyl, e.g., β-hydroxy-γ-chloropropyl; lower alkylsulfonylalkyl, e.g., methylsulfonylethyl; lower alkyl —OCOOCH$_2$CH$_2$—, e.g., CH$_3$OCOOCH$_2$CH$_2$—; carbamoylalkyl, e.g. carbamoylethyl; lower alkylcarbamoylalkyl, e.g. ethylcarbamoylethyl; benzyl, phenoxyalkyl, e.g., β-phenoxyethyl; lower alkylsulfonamidoalkyl, e.g., methylsulfonamidoethyl; dicarboxamidoalkyl, e.g., β-dicarboxamidoethyl, etc. or $R_3$ represents a monocyclic carbocyclic aromatic group of the benzene series, e.g. unsubstituted phenyl and substituted phenyl such as represented by $R_1$ and $R_2$ above e.g. lower alkylphenyl, lower alkoxyphenyl, halophenyl etc. As can be seen from the examples below, the substituents attached to R, $R_1$, $R_2$ and $R_3$ serve primarily as auxochrome groups to control the color of the disazo compounds.

$R_4$ represents a lower alkylene group i.e. a straight or branched aliphatic chain of from 1 to 4 C atoms, and Y represents a chain of atoms containing at least one atom other than carbon, i.e. oxygen, nitrogen or sulfur, necessary to complete a 5 or 6 atom ring, for example as present in the dicarboximido radicals; 3,5-morpholinedione, 2,5-piperazinedione, 5,6-dihydrouracil and 2,4-thiazolidinedione of the azo compounds described below.

Typical chains of atoms represented by Y are

—CH$_2$—NH—CH$_2$—,—NHCH$_2$CH$_2$—,—SCH$_2$—,
—CH$_2$SO$_2$CH$_2$—,—N(CH$_3$)CH$_2$— and —NHCH(C$_6$H$_5$)— etc. illustrated in the following examples.

Herein, "lower alkyl group," "lower alkylene group" and the like, means that the group contains a chain of from 1 to 4 carbon atoms, straight or branch chained.

The disazo compounds of this invention are prepared by diazotization of amino azo compounds,

R—N=N—R$_1$—NH$_2$ wherein $R_2$, $R_3$, $R_4$, and Y have the meanings given above. diazotized products with the coupler of general formula II 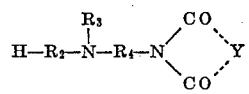

wherein $R_2$, $R_3$, $R_4$, and Y have the meanings given above.

The coupling components having Formula II are prepared by one of the two following methods (1) 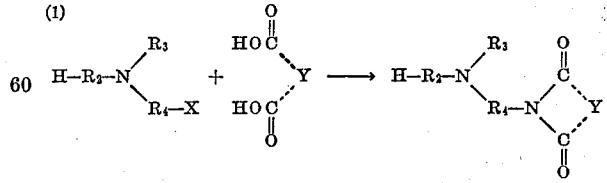

or anhydride (2)

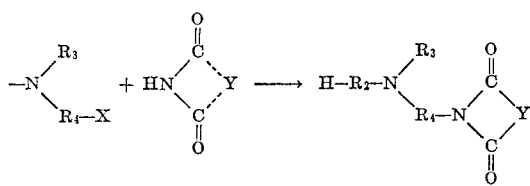

in which X is halogen.

The compounds wherein Y contains the —C—N— chain are illustrated by the uracil, dihydrouracil, hydantoin and piperazinedione substituted compounds of the examples. Where Y contains the —C—O— chain the morpholinedione substituted compounds of the examples are illustrative, and where Y contains the —C—S— chain the thiazolidinedione substituted compounds of the examples are illustrative.

The disazo compounds can be used for dyeing textile materials including synthetic polymer fibers, yarns and fabrics giving a variety of fast shades including brilliant yellow to violet shades when applied thereto by conventional dyeing methods. The disazo compounds have good affinity for polyamide, cellulose ester and polyester fibers, the fastness properties being especially good on cellulose acetate and polyester fibers. When the azo compounds are used for dyeing such hydrophobic materials, they should be free of water-solubilizing groups such as sulfo and carboxyl. In general the dyes have good fastness, for example, to light, washing, gas (atmospheric fumes) and sublimation. Thus the disazo compounds can be expected to respond well to other tests for textile dyes such as described in the A.A.T.C.C. Tech. Manual, 1964 edition depending upon the particular azo compound and fiber being dyed.

As can be seen from the examples below, the various substituents attached to radicals R, $R_1$, $R_2$, $R_3$ and chain Y illustrated above, serve primarily as auxochrome groups to control the color of the disazo compounds, and disazo compounds particularly useful as textile dyes are obtained within the wide range of substitution given above.

The disazo compounds of the invention may be used for dyeing hydrophobic fibers such as linear polyester, cellulose ester, acrylic, polyamide, etc. fibers in the manner described in U.S. Patents 2,880,050, 2,757,064, 2,782,187 and 2,043,827. The following examples illustrate methods by which the disazo compounds of the invention can be used to dye polyester textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added with stirring, until a fine emulsion is obtained. Water is then slowly added to a total volume of 200 cc., 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the disazo compounds of the invention are water-insoluble, they can be applied from aqueous dispersions in the manner of the so-called "dispersed dyes." However, coloration can also be effected, for example, by incorporating the disazo compounds into the spinning dope and spinning the fiber as usual. The disazo compounds of our invention have varying utility as dyes. The degree of utility varies, for example, depending upon the material being dyed and the formula of the disazo compound. Thus, for example, all the dyes will not have the same degree of utility for the same material.

By cellulose aliphatic carboxylic acid esters having 2 to 4 carbon atoms in the acid groups thereof, we mean to include, for example, both partially hydrolyzed and unhydrolyzed cellulose acetate, cellulose propionate and cellulose acetatebutyrate.

Polymeric linear polyester materials of the terephthalate type are illustrative of the linear aromatic polyester textile materials that can be dyed with the new disazo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the disazo compounds.

The following examples will serve to illustrate the preparation of representative intermediates and azo compounds of our invention.

EXAMPLES OF COUPLERS

Preparation 3-[2-(N-ethyl-m-toluidino)ethyl]hydantoin 19.7 g. N-2-chloroethyl-N-ethyl-m-toluidine, 10.0 g. hydantoin, 13.8 g. potassium carbonate, and 150 ml. dry dimethylformamide were refluxed together for one hour. The reaction mixture was drowned into 500 ml. of water giving a white solid on standing. The product was recrystallized from ethanol to give 13.5 g. of material melting at 76–77° C., having the structure:

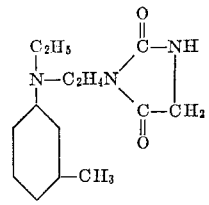

Preparation of 3-[2-(N-ethyl-m-toluidino)ethyl]-5,5-dimethylhydantoin 19.7 g. N-2-chloroethyl-N-ethyl-m-toluidine, 12.8 g. 5,5-dimethylhydantoin, 13.8 g. potassium carbonate, and 150 ml. dry dimethylformamide were refluxed together for one hour. Drowning into water, filtering, and recrystallizing from 75 ml. ethanol gave 15.2 g. white solid product with M.P. 81–82° C.

Preparation of 3-[2-(N-ethyl-m-toluidino)ethyl]-1-methyl hydantoin 19.7 g. N-2-chloroethyl-N-ethyl-m-toluidine, 11.4 g. 1-methylhydantoin, 13.8 g. potassium carbonate, and 100 ml. dry dimethylformamide were refluxed together for one hour. Drowning in water resulted in a white solid which was collected by filtration, washed with water, and recrystallized from 100 ml. ethanol to yield 18.5 g. product with M.P. 72–73° C.

Preparation of 4-[2-(N-ethyl-m-toluidino)ethyl]3,5-morpholinedione 89.0 g. N-2-aminoethyl-N-ethyl-m-toluidine, 67.0 g. diglycolic acid, and 0.1 g. sulfanilic acid were heated together at 150–155° C. for one hour. The reaction mixture was poured into 500 ml. ethanol and the product allowed to crystallize. After collection by filtration and recrystallization from 500 ml. ethanol there was obtained 70.5 g. of product of M.P. 82–83° C. This material has the following structure:

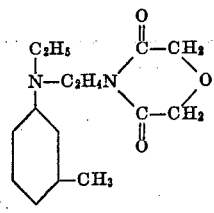

Preparation of 1-[2-(N-ethyl-m-toluidino)-
ethyl]-2,6-piperazinedione 44.5 g. N-2-aminoethyl-N-ethyl-m-toluidine, 33.2 g. iminodiacetic acid, 0.1 g. sulfanilic acid were heated together at 180–190° C. for one hour. The reaction mixture was then poured into 300 ml. ethanol and the product allowed to crystallize. Collection by filtration gave 20.0 g. product when air dried. M.P. 191–194° C. One recrystallization from ethanol gave material melting at 197.5–198.5° C. The product had the following structure:

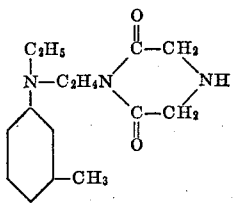

Preparation of 3-[2-(N-ethyl-m-toluidino)-
ethyl]5,6-dihydrouracil 19.7 g. N-2-chloroethyl-N-ethyl-m-toluidine, 11.4 g. 5,6-dihydrouracil, 13.8 g. potassium carbonate, and 100 ml. dry dimethylformamide were refluxed together for one hour. The reaction mixture was drowned into water, and the product collected by filtration, washed with water, and recrystallized from 50% aqueous ethanol. Yield: 20.5 g., M.P. 108–110° C. The product has the following structure:

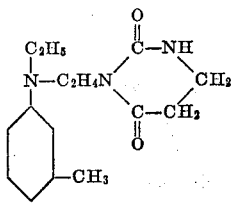

Preparation of 3-[2-(N-ethyl-m-toluidino)-
ethyl]2,4-thiazolidinedione 19.7 g. N-2-chloroethyl-N-ethyl-m-toluidine, 11.7 g. 2,4-thiazolidinedione, 13.8 g. potassium carbonate, and 100 ml. dry dimethylformamide were heated together at 130° C. for one hour. Drowning of the reaction mixture into water gave a yellow oil, which was washed by decantation and taken up in 100 ml. ethanol. The product crystallized when alcohol solution was chilled. There was obtained 10.0 g. of product after filtering and drying in air, M.P. 59–60° C.

All of the couplers used were prepared by one of the above methods.

EXAMPLES OF THE DYES

Example 1

1.8 g. dry NaNO₂ was dissolved in 12.5 cc. conc. H₂SO₄. This solution was cooled to about 5° C. and 25 cc. 1:5 acid was added below 10° C. Then 5.97 g. of 1-amino-2,5,3'-trimethylazo benzene was added, followed by 25 cc. 1:5 acid (1 part propionic to 1 part acetic). The reaction mixture was stirred 2 hr. at ice-bath temperature, then added to a chilled solution of 6.53 g. of 3-[2-(N-ethyl-m-toluidino)ethyl]hydantoin in 50 cc. 1:5 acid. The mixture was neutralized to Congo red with solid ammonium acetate and dried. The product dyes cellulose acetate, polyester, and nylon fibers a brilliant red. It has the structure:

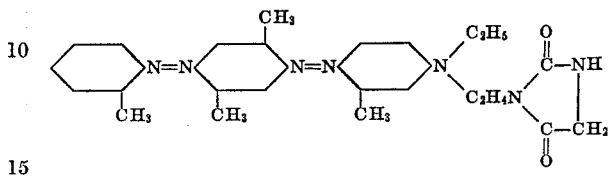

Example 1a 1.8 g. dry NaNO₂ was dissolved in 12.5 cc. conc. H₂SO₄. This solution was cooled to about 5° C. and 25 cc. 1:5 acid was added below 10° C. Then 6.5 g. 1-amino-4'-chloro-2,5-dimethylazobenzene was added, followed by 25 cc. 1:5 acid. The reaction mixture was stirred 2 hr. at ice-bath temperature, then added to a chilled solution of 6.9 g. of 4-[2-(N-ethyl-m-toluidino)ethyl]-3,5-morpholinedione in 50 cc. 1:5 acid. The mixture was neutralized to Congo red with solid ammonium acetate and allowed to couple 2 hr. It was then drowned in water, filtered, washed with water, and dried. The product dyes cellulose acetate, polyester, and nylon fibers orange. It has the structure:

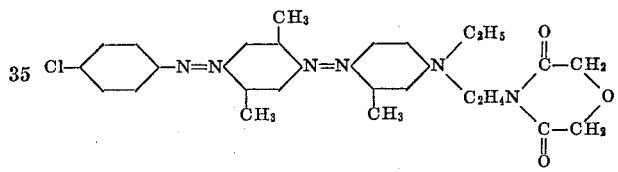

Example 1b 1.8 g. dry NaNO₂ was dissolved in 12.5 cc. conc. H₂SO₄. This solution was cooled to about 5° C. and 25 cc. 1:5 acid was added below 10° C. Then 4.85 g. aminoazobenzene was added, followed by 25 cc. 1:5 acid. The reaction mixture was stirred 2 hr. at ice-bath temperature, then added to a chilled solution of 7.1 g. of 3-[2-(N-β-hydroxy-ethyl-m-chloroanilino)ethyl]2,4-thiazolidinedione in 50 cc. 1:5 acid. The mixture was neutralized to Congo red with solid ammonium acetate and allowed to couple 2 hr. It was then drowned in water, filtered, washed with water, and dried. The product dyes cellulose acetate, polyester, and nylon fibers orange. It has the structure:

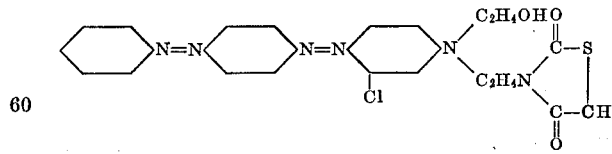

The disazo compounds of the following table, having Formula II below, are prepared by the process of Example 1 by diazotizing the indicated aminoazobenzene and coupling with the indicated coupling component.

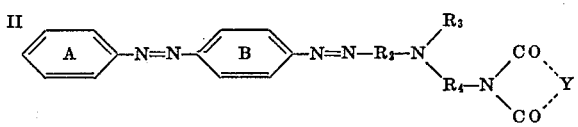

The color is that obtainable on polyester fibers.

| Example | Substituents A | Substituents B | R₂ | R₃ | R₄ | Y | Color |
|---|---|---|---|---|---|---|---|
| 2 | None | None | m-Tolyl | —C₂H₅ | —CH₂CH₂— | —CH₂NH— | Red. |
| 3 | do | do | do | —C₂H₄CN | —CH₂CH₂— | —NHCH—<br>(cyclohexyl) | Orange. |
| 4 | do | do | do | —C₂H₄OH | —CH₂CH₂— | —CH₂S— | Red. |
| 5 | do | do | do | —C₂H₄Cl | —CH₂CH₂— | CH₃<br>\|<br>—N—CH₂— | Orange. |
| 6 | 4-Cl | 3-CH₃ | Phenyl | —C₂H₅ | —(CH₂)₃— | —CH₂SO₂CH₂— | Red. |
| 7 | 3-Cl | 3-CH₃ | do | —C₆H₅ | —(CH₂)₃— | —NHCH₂CH₂— | Red. |
| 8 | 2-Cl | 3-CH₃ | do | —C₂H₄N(CO)₂Y (phthalimido) | —(CH₂)₃— | —CH₂OCH₂— | Orange. |
| 9 | 3,6-di-Cl | 3-CH₃ | do | —C₂H₅ | —CH₂CHCH₃ | —CH₂SCH₂— | Red. |
| 10 | None | 3-CH₃ | do | —C₂H₄OCOCH₃ | —CH₂CHCH₃ | —CH₂NHCH₂— | Orange. |
| 11 | do | 3-CH₃ | m-Cl-phenyl | —C₂H₄OCONHC₆H₅ | CH₃<br>\|<br>—CH₂CHCH₂— | —CH₂O— | Do. |
| 12 | do | 3-CH₃ | do | —C₂H₄OCO₂C₂H₅ | CH₃<br>\|<br>—CH₂CHCH₂— | —CH=CH—NH | Do. |
| 13 | 2-CH₃ | 2-CH₃ | do | —C₂H₄CO₂C₂H₅ | OH<br>\|<br>—CH₂CHCH₂— | —NHNH— | Do. |
| 14 | 2-CH₃ | 2-CH₃ | m-OCH₃-phenyl | —C₂H₄CONH₂ | OH<br>\|<br>—CH₂CHCH₂— | CH₃<br>\|<br>—C—NCH₂OH<br>\|<br>CH₃ | Red. |
| 15 | 4-CH₃ | 3-CH₃ | do | —C₂H₄SO₂CH₃ | Cl<br>\|<br>—CH₂CHCH₂ | —NH-(phenyl) | Red. |
| 16 | 4-CH₃ | 3-CH₃ | do | OH<br>\|<br>—CH₂CHCH₂Cl | Cl<br>\|<br>—CH₂CHCH₂ | —O-(phenyl) | Red. |
| 17 | 3-CH₃ | 3-CH₃ | 2,5-dimethyl phenyl | —C₂H₄OCH₃ | —CH₂CH₂— | CH₃<br>\|<br>—NHCH— | Red. |
| 18 | 3-CH₃ | 3-CH₃ | 3-chlorophenyl | —C₂H₄NHCOCH₃ | —CH₂CH₂— | —CH₂OCH₂— | Red. |
| 19 | 4-OCH₃ | 3-CH₃ | do | —C₂H₅ | —CH₂CH₂— | —NHCHCH₂OH | Red. |
| 20 | 4-CH₃ | 3-CH₃-6-OCH₃ | m-Tolyl | —C₂H₅ | —CH₂CH₂— | —NHCHC₄H₉ | Pink. |
| 21 | 4-NHCOCH₃ | 3-CH₃ | o-Tolyl | —C₂H₅ | —CH₂CH₂— | —NHCHCOOH | Red. |
| 22 | 4-SO₂NH₂ | 2-Cl | 3,6-di-OCH₃ phenyl | —C₂H₅ | —CH₂CH₂— | CH₂<br>/  \<br>CH₂  CH₂<br>—N——CH | Red. |
| 23 | 4-NO₂ | 3-CH₃ | 3-OCH₃-phenyl | —C₂H₅ | —CH₂CH₂— | —NHCH₂CH₂— | Pink. |
| 24 | 4-SO₂CH₃ | 3-OCH₃ | do | —C₂H₅ | —CH₂CH₂— | —SCH₂— | Violet. |
| 25 | 4-SO₂N(CH₃)₂ | 3,6-di-OCH₃ | 3-NHCOCH₃-phenyl | —C₂H₅ | —CH₂CH₂— | —SCH₂— | Do. |
| 26 | 3-CH₂OH | 3-CH₃ | Phenyl | —C₂H₅ | —CH₂CH₂— | —CH₂SCH₂— | Red. |
| 27 | None | 2-Cl | m-Tolyl | C₂H₅ | —CH₂CH₂— | —SCH₂— | Red. |
| 28 | 4-NHCOOH₃ | 2,5-di-CH₃ | do | C₂H₅ | —CH₂CH₂— | —NHCH₂— | Pink. |
| 29 | None | None | do | C₂H₅ | —CH₂CH₂— | CH₃<br>\|<br>—N—CH₂— | Orange. |

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A water-insoluble compound having the formula

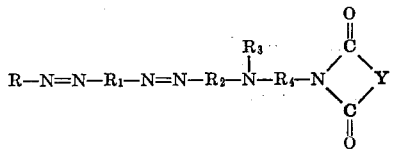

wherein:

R represents a monocyclic, carbocyclic, aromatic radical;

$R_1$ and $R_2$ are the same or different and each represents p-phenylene or p-phenylene substituted with lower alkyl, lower alkoxy, halogen, lower alkylthio, lower alkanoylamido, or lower alkylsulfonamido;

$R_3$ represents hydrogen; lower alkyl; lower alkyl substituted with hydroxy, lower alkoxy, cyano, lower alkanoyloxy, lower carbalkoxy, halogen, lower alkylsulfonyl, lower —OCOOCH$_2$CH$_2$—, carbamoyl, lower alkylcarbamoyl, phenyl, phenoxy, phenylcarbamoyloxy, or lower alkyl sulfonamido; phenyl; or phenyl substituted with lower alkyl, lower alkoxy, or halogen;

$R_4$ represents lower alkylene or lower alkylene substituted with chlorine or hydroxy; and Y represents —NHCH$_2$—, —NHC(CH$_3$)$_2$—, —NHCH(CH$_3$)—, —N(CH$_3$)CH$_2$—, —CH$_2$CH$_2$—,
—CH$_2$NHCH$_2$, —NHCH$_2$CH$_2$—, —SCH$_2$—

—NHCHC$_6$H$_5$

—CH$_2$SO$_2$CH$_2$—, —CH$_2$SCH$_2$—, —CH$_2$O—
—CH=CHNH—, —NHNH—

—C(CH$_3$)$_2$NCH$_2$OH, —NHCHCH$_2$OH, —NH—⟨phenyl⟩—O—⟨phenyl⟩ or

CH$_2$CH$_2$CH$_2$
|         |
N———CH—

2. A water-insoluble compound having the formula

R—N=N—R$_1$—N=N—R$_2$—N—R$_4$—N⟨CO / CO⟩Y
                         |
                         R$_3$ wherein:

R represents phenyl or phenyl substituted with lower alkyl, lower alkoxy, halogen, lower alkanoylamido, sulfonamido, nitro, lower alkylsulfonyl, trifluoromethyl, lower carbalkoxy, or cyano;

$R_1$ and $R_2$ are the same or different and each represents p-phenylene or p-phenylene substituted with lower alkyl, lower alkoxy, halogen, or lower alkanoylamido;

$R_3$ represents lower alkyl or lower alkyl substituted with hydroxy, halogen, lower alkanoyloxy, or cyano;

$R_4$ represents lower alkylene; and

Y represents —NHCH$_2$—, —NHC(CH$_3$)$_2$,
—N(CH$_3$)CH$_2$—, —CH$_2$OCH$_2$—, —CH$_2$NHCH$_2$—
—NHCH$_2$CH$_2$—, —SCH$_2$—

3. A water-insoluble compound having the formula

R—N=N—R$_1$—N=N—R$_2$—N—R$_4$—N⟨CO / CO⟩Y
                         |
                         R$_3$ wherein:

R represents phenyl or phenyl substituted with lower alkyl;

$R_1$ and $R_2$ are the same or different and each represents p-phenylene or p-phenylene substituted with lower alkyl;

$R_3$ represents lower alkyl;

$R_4$ represents ethylene; and

Y represents —NHCH$_2$—, —CH$_2$OCH$_2$—, or

—SCH$_2$—

4. The compound

⟨Ph⟩—N=N—⟨Ph(CH$_3$)(CH$_3$)⟩—N=N—⟨Ph(CH$_3$)⟩—N(C$_2$H$_5$)—C$_2$H$_4$—N⟨CO-NH / CO-CH$_2$⟩

5. The compound

⟨Ph⟩—N=N—⟨Ph⟩—N=N—⟨Ph(CH$_3$)⟩—N(C$_2$H$_5$)—C$_2$H$_4$—N⟨CO—NH / CO—CH$_2$⟩

6. The compound

⟨Ph⟩—N=N—⟨Ph(Cl)⟩—N=N—⟨Ph(CH$_3$)⟩—N(C$_2$H$_5$)—C$_2$H$_4$—N⟨CO—S / CO—CH$_2$⟩

7. The compound

CH$_3$CONH—⟨Ph⟩—N=N—⟨Ph(CH$_3$)(CH$_3$)⟩—N=N—⟨Ph(CH$_3$)⟩—N(C$_2$H$_5$)—C$_2$H$_4$—N⟨CO—NH / CO—CH$_2$⟩

8. The compound
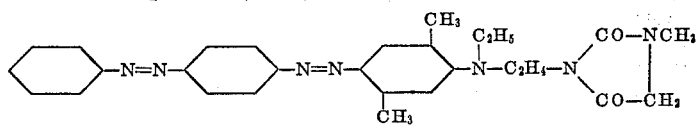
References Cited
UNITED STATES PATENTS
| | | | |
|---|---|---|---|
| 3,148,178 | 9/1964 | Wallace et al. | 260—152 |
| 3,148,180 | 9/1964 | Straley et al. | 260—158 |
| 3,161,631 | 12/1964 | Straley et al. | 260—158 |
FLOYD D. HIGEL, *Primary Examiner.*